United States Patent [19]

Mason

[11] 4,155,069
[45] May 15, 1979

[54] FLASHER CONTROLLER

[76] Inventor: Robert D. Mason, 5501 Mick Ave., SE., Grand Rapids, Mich. 49508

[21] Appl. No.: 809,332

[22] Filed: Jun. 23, 1977

[51] Int. Cl.$^2$ ............................................. B60Q 1/46
[52] U.S. Cl. ................................... 340/81 R; 340/73; 340/76; 315/82
[58] Field of Search ....................... 340/56, 72, 73, 76, 340/81 R, 81 F; 307/10 LS, 10 R; 315/82, 83

[56] References Cited

U.S. PATENT DOCUMENTS

| | | | |
|---|---|---|---|
| 3,319,073 | 5/1967 | Wrin | 340/73 X |
| 3,555,507 | 1/1971 | Burson, Jr. | 340/73 X |
| 3,767,966 | 10/1973 | Bell | 340/76 X |
| 3,829,828 | 8/1974 | Hutchinson et al. | 340/76 X |
| 3,881,128 | 4/1975 | Douglas et al. | 307/10 LS |

Primary Examiner—Donald J. Yusko
Attorney, Agent, or Firm—Wilfred O. Schmidt

[57] ABSTRACT

A flasher controller comprised of two integrating circuits, one functioning as a pulse width modulator and the other as a free running 50% duty cycle oscillator which in combination drive on a selective basis the base of one of two transistors in accordance with a pulsed voltage of predetermined frequency: the emitter of one transistor and the collector of the other are each connected to energize the solenoid of the power relay connected in series in a pre-existing automotive lamp circuit and thereby alternately open and close that circuit in accordance with the said pulsed voltage.

9 Claims, 5 Drawing Figures

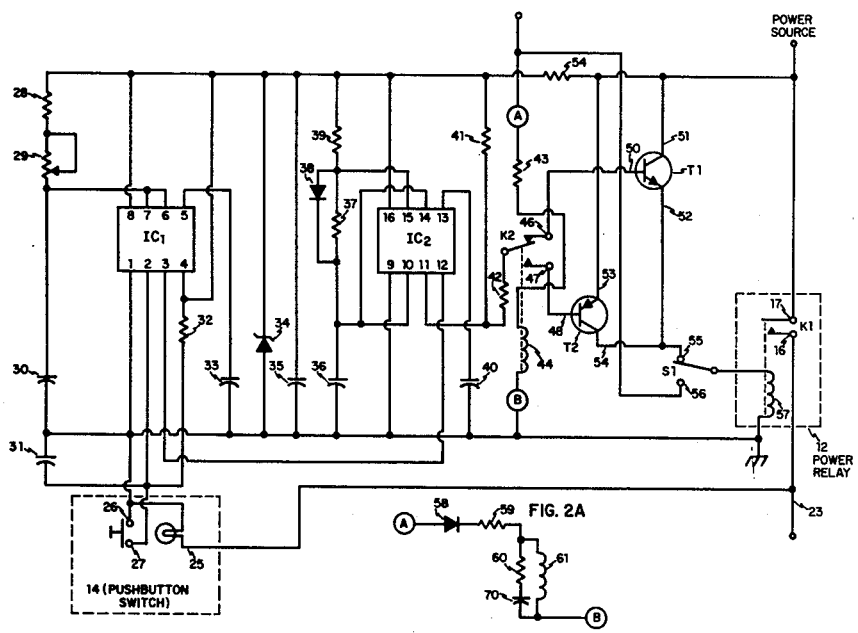

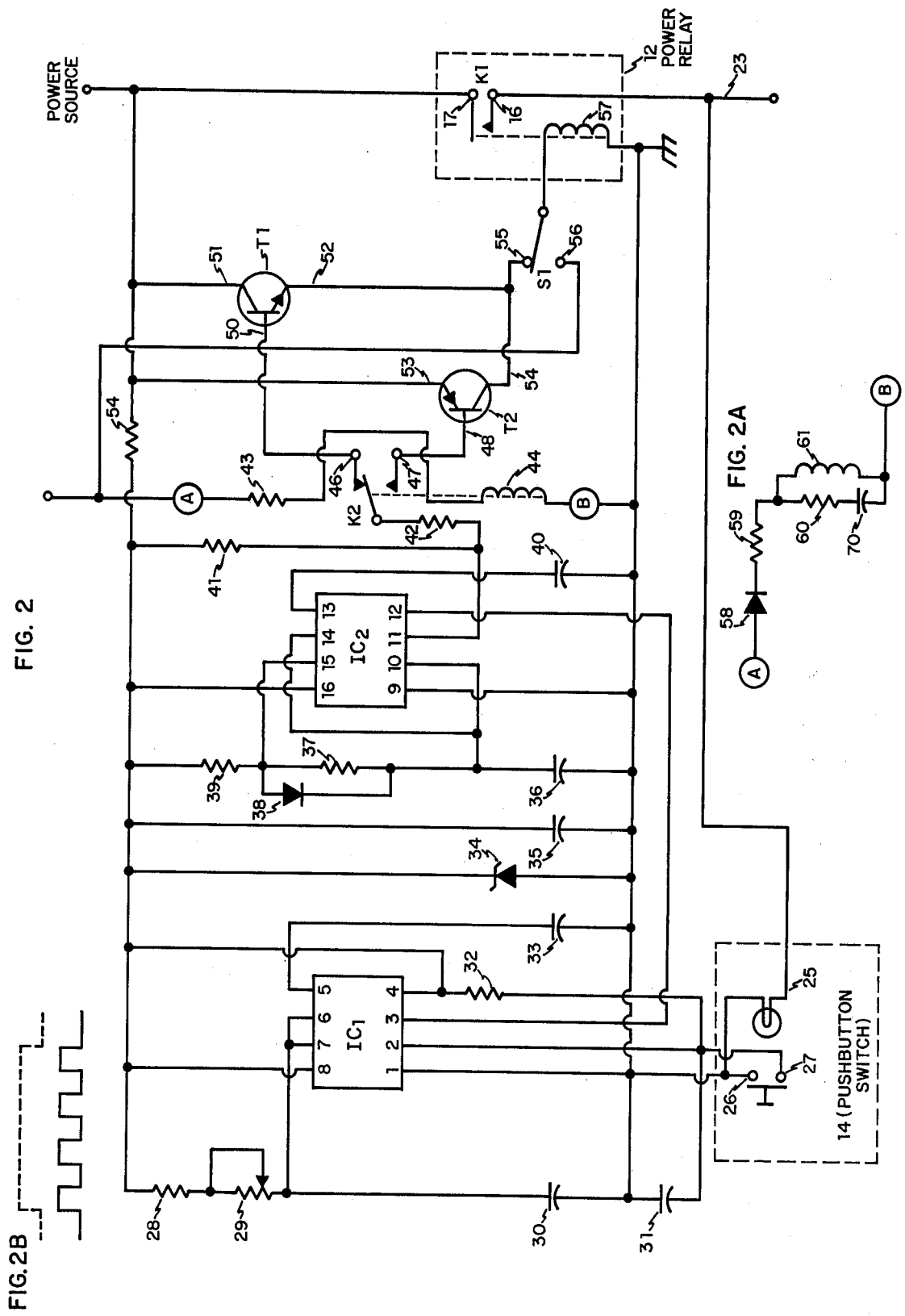

FLASHER CONTROLLER

SUMMARY OF INVENTION

This invention relates to a transistorized flasher controller utilizing a pulse width modulator and a free running oscillator to flash or blink an automotive lamp circuit in accordance with a predetermined series of pulses. The flasher controller upon a single depression at the push button switch will automatically flash or blink the respective lamp circuit a given number of pulses of a predetermined pulse rate. Further, by mechanical engagement the push button switch will remain in a depressed state and continue the predetermined pulse rate for an extensive period until released to the former non-depressed state.

The light contained in the push button will be energized at the same pulse rate as the respective lamp circuit; indicating to the operator that the pulsing of that circuit has been initiated. In the event the light within the push button fails to operate, the operator is alerted a malfunction exists in the lamp or the flasher controller circuit. The malfunction can be quickly localized by manually switching the by-pass switch to determine whether the flasher is at fault or the automotive lamp circuit. When the by-pass switch is switched from the normal position of engaging the flasher controller, the running or clearance lights will be illuminated only if the headlight circuit has been energized. If the running or clearance lights do not come on, the problem may be a short in the running or clearance lights circuit, blown circuit breaker or a bad power relay.

During night driving, the headlight circuit of the semi-truck or other vehicle is energized, and in turn, also the running or clearance light circuit. In order to achieve flashing, the circuit must be turned "off" in accordance with the predetermined pulse rather than turned "on" as in day time driving when the headlight circuit is not energized. This is accomplished by the collector voltage of the respective transistor blocking out the voltage across the solenoid relay, thereby permitting the relay to return to the normal "open" state.

An optional circuit is provided to insure that in the "off" state, only a certain circuit is flashed or blinked. That is, the headlight circuit can be interrupted at a certain pulse frequency without affecting the running or clearance circuit lights assuming the "off" condition of the headlight circuit does not exceed a given time interval. A duration in the "off" state for the headlight circuit in excess of 3 seconds would also turn "off" the running a clearance light circuit.

The flasher controller is readily connected to an existing lamp circuit by means of dummy multiple contact fuses. These fuses replace the ordinary fuse in the circuit and by means of the multiple contacts, the flasher controller is readily connected into the circuit.

The flasher controller is not load sensitive and will not fail to operate if the number of lamps in the circuit are increased or decreased e.g. adding or dropping of a second trailer.

BACKGROUND OF INVENTION

The flasher controller was primarily designed for the highway semi-truck to accommodate the need to signal other operators of similar vehicles or operators of other vehicular traffic as in the case of warning, emergency, acknowledgement or a courtesy gesture. Previously, such need was accommodated by the operator manually operating a two-position switch several times to simulate a flashing sequence of the respective automotive lamp circuit. The flasher controller of this invention, seeks to satisfy the need for signalling, and yet leave the operator free to devote his entire attention to driving.

IN THE DRAWINGS

FIG. 2 is a circuit diagram of the flasher controller in accordance with the invention.

FIG. 2A is a circuit diagram of the optional delay to be used in the flasher controller in conjunction with the headlight circuit.

FIG. 2B is an illustration of the pulse train used in the flasher controller.

DETAILED DESCRIPTION

Figure 1:
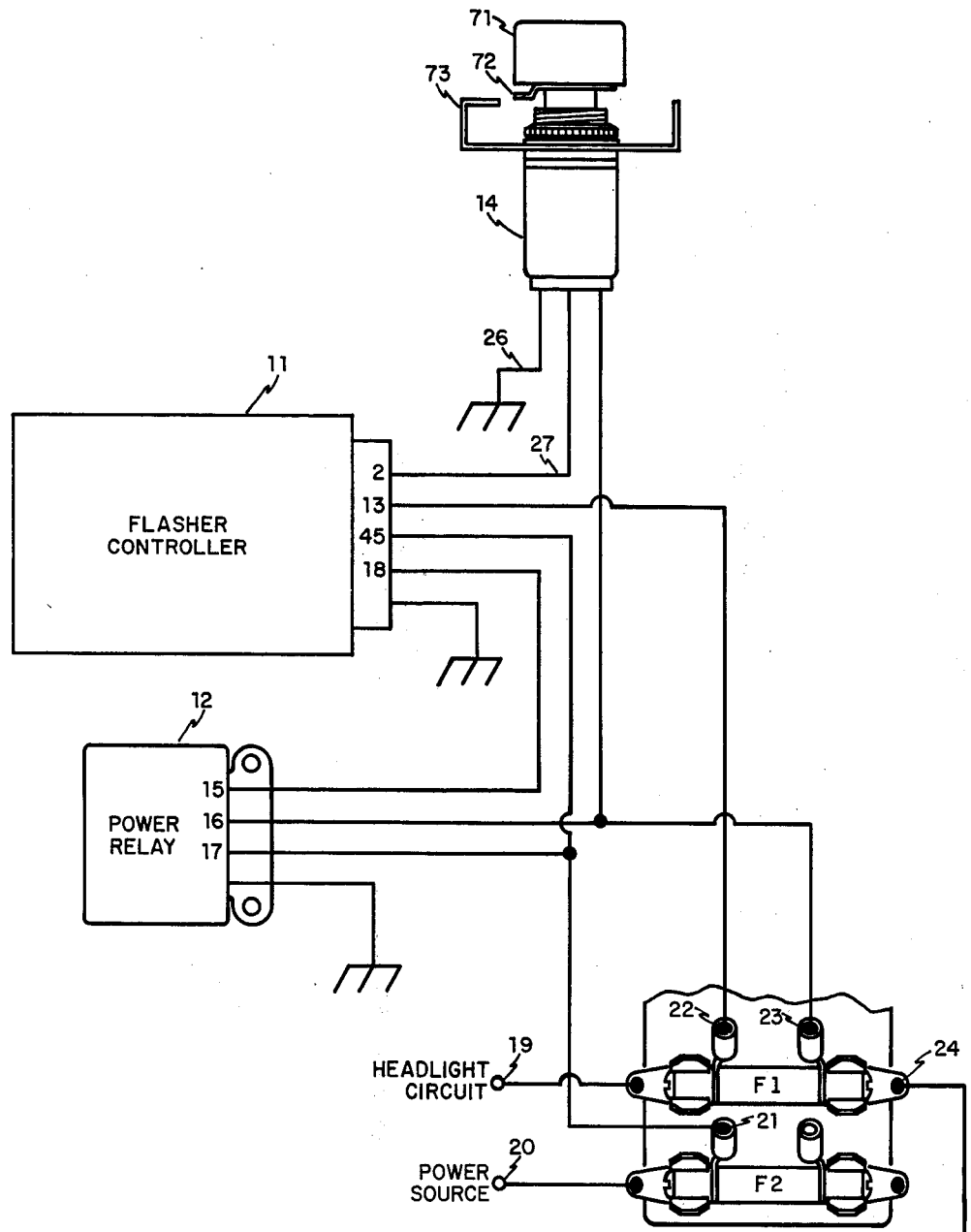
FIG. 1 is an illustration in block form showing a flasher controller assembly connected in series with a power source and a circuit for automotive running or clearance lights.

Turning to FIG. 1 the flasher controller assembly consists of the power relay 12, the flasher controller 11, the push button switch 14, and the dummy multiple contact fuses F1 and F2. The multiple contact fuses F1 and F2 are replacements for the ordinary fuses and readily snap into position in the existing fuse holders. One branch of the circuit from power terminal 20 is routed through the left conductive portion of the dummy fuse F2 at 21, and connected to the power relay 12 at terminal 17 and is connected to the flasher controller at 45. The power circuit branch is completed from terminal 16 to terminal 23 on the right conductive portion of dummy fuse F1 and to terminal 24 to the running or clearance light circuit 28. A parallel branch of the power circuit is through the push button switch 14 at terminal 25 and to ground. The push button switch 14 from terminal 27 is connected to the flasher controller 11 input terminal 2. The headlight circuit is routed through the left conductive portion of the dummy fuse F1 at terminal 22 and connected to the flasher controller 11 at terminal 13.

The push button 14 is spring loaded and upon knob 71 being depressed only momentarily and released will initiate the given time cycle in which a pulse or series of pulses will be generated by the flasher controller. Also the knob 71 can be locked in a depressed state and the flasher controller will generate a continuous series of like frequency pulses, when e.g. a continuous warning flash is required. In order to achieve the locked depressed state, a retaining ring 73 is slid forward engaging the protruding lever 72 to the knob 71. To release the knob, of course, the retainer ring must be slid back.

Figure 1A:
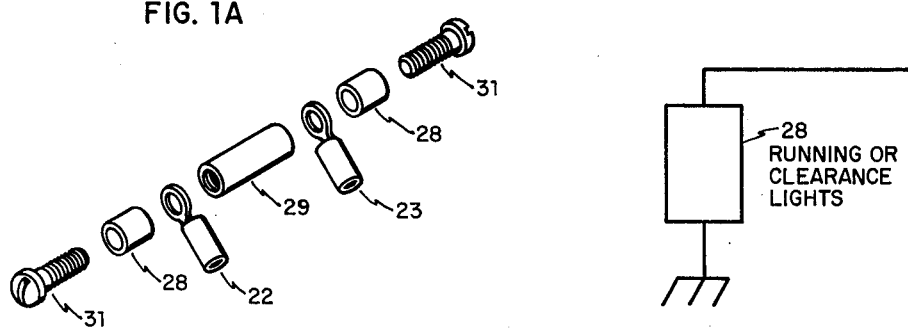
FIG. 1A is an exploded view of the dummy multiple contact fuse.

FIG. 1A illustrates an exploded view of the dummy multiple contact fuse F2. The description for dummy fuse F2 is also applicable to dummy fuse F1 because of similarity. The dummy multiple contact fuse is a combination of a left conductive portion or sleeve 28 and tongue electrical contact 22, separated from the tongue electrical contact 23 and the right conductive portion or sleeve 28 by the threaded non-conductive portion or insulated sleeve 29. The whole combination is then bolted together by the right and left bolts 31 into the threaded nonconductive or insulated sleeve 29. It is the function of the dummy multiple contact fuses F1 and F2 to connect the flasher controller assembly in series with the power source and the existing automotive running or clearance light circuit.

FIG. 2 illustrates the preferred circuit for the flasher controller 11. A pair of integrating circuits IC1 and IC2, one functioning as a pulse width modulator and the other as a free running 50% duty cycle oscillator are utilized. The integrating circuit IC1 and IC2 are commercially available and are designated as LM555/LM555C timer in the copyright manual entitled "Linear Data Manual" by National Semi-Conductor Corp., 1976.

The integrating circuit IC1 and IC2 together drive the base of the transistor T1 (NPN) during daylight driving and the base of T2 (PNP) when the automotive headlight circuit is energized.

The output of the respective transistor in turn controls the energization or de-energization of the solenoid relay K1 which is connected in series with the running or clearance light circuit 28.

The integrating circuit IC1 has the associated circuitry comprising an overall pulse width network consisting of resistor 28 variable resistor 29 and capacitance 30 connected between the combined reset and voltage terminals 4 & 8 and the combined threshold and discharge terminal 6 & 7. A parallel circuit to ground is through terminal 1. The control voltage terminal 5 is bypassed to ground by capacitance 33. The reset terminal 4 is also connected to the trigger terminal 2 through the reset pulse resistor 32 and then bypassed to ground through capacitance 31.

The contacts 81 and 82 of the push button switch 14 are connected across the trigger terminal 2 and ground terminal 1. A light 80 is contained in the push button proper and connected to the running or clearance light cicuit 28. (see FIG. 1)

A Zenner diode 34 is an over voltage protector for the IC's and fixes the polarity of the current flow in the circuit and is in parallel relationship with the power supply filter capacitance 35.

The integrating circuit IC2 has the associated circuitry comprising a frequency control network consisting of resistor 39, resistor 37 and capacitance 36. A diode 38 is connected across resistor 37 which limits the duty cycle to less than a 50% "on time" pulse. The network is connected between the combined trigger and threshold terminals 10 & 14 and the voltage terminal 16. The control voltage terminal 13 is bypassed to ground through capacitance 40. The reset terminal 12 is connected to the output terminal 3 of IC1. The output terminal 11 of IC2 is connected through the biasing resistor 42 and relay K2 to the base of either transistor T1 (NPN) or T2 (PNP). An "on load" resistor 41 is connected in series with the biasing resistor 42. The solenoid 44 of the relay K2 is connected to the automotive headlight circuit through the current limiting resistor 43.

The relay K2 when solenoid 44 is not energized normally engages contact 46 and the output of the IC2 drives the base 50 of transistor T1. The collector 51 of the transistor T1 is connected to the automotive power supply and the emitter 52 is connected through contact 55 of the bypass switch S1 to the solenoid 57.

The relay K2 when the solenoid is energized, engages the contact 47 and the output of IC2 drives the base 48 of transistor T2. The emitter 53 of the transistor T2 (PNP) is connected to the automotive power supply and the collector 54 is connected through contact 55 of bypass switch S1 to the solenoid 57.

The bypass switch S1 is set to engage contact 55 when the flasher is operative. When the by-pass switch is manually switched to engage contact 56 it is directly connected in the headlight circuit thereby by-passing the flasher controller circuitry.

The by-pass switch S1 is only used if failure should occur in the flasher controller circuit. A failure would cause the automotive running or clearance lights to extinguish. Manual operation of the two position switch will connect the switch to contact 56 and the running or clearance lights will function in concert with the headlight circuit.

FIG. 2A. The optional delay circuit A & B can be incorporated in the automotive headlight circuit by replacing the circuit identified as between A & B. The optional delay circuit consists of a diode 58 which prevents a voltage bleed-off through capacitance 70 during the delay cycle. Resistor 59 is a current limiting resistor, the resistor 60 and capacitor 70 determines the hold-in time delay of the K2 relay. As the result when the headlight circuit is extinguished for less than 3 seconds, the running or clearance lights will continue to stay energized as the relay K2 by reason of the time delay is held in engagement with contact 47.

FIG. 2B. Two pulse trains are shown, the pulse IC1 is associated with that integrated circuit and pulse IC2 with the other. The pulse IC1 is the overall time cycle in which the fixed pulse IC2 will drive the base of the respective transistor T1 or T2. The overall time cycle can be shortened by varying the resistor 29 thereby selecting whether one or up to four pulses of the output of IC2 shall be applied to the said base.

OPERATION

When the push button knob 71 is momentarily depressed the input trigger terminal 2 of integrated circuit IC1 is grounded for the duration of the time cycle determined by resistor 28, variable resistor 29 and capacitance 30. During this period a voltage appears at terminal 3 which is fed into integration circuit IC2 at terminal 12. The width of the voltage pulse appearing at terminal 3 can be varied in time duration by adjustment of the variable resistor 29.

FIG. 2A shows the time cycle pulse of integrated circuit UC1 to encompass four pulses of the free running 50% duty cycle integrator IC2. As the time cycle is reduced in time, the number of pulses of the predetermined frequency will be decreased. The minimum and maximum pulses being from one to four.

The voltage pulse energization of IC2 at terminal 12 results in a pulse train (one to four pulses) at the output terminal 11 of IC2. In the event the headlight circuit is not energized then the base 50 of T1 (NPN) is driven until a current flows from collector 51 to emitter 52 then through the coil 57 closing the relay K1.

In the event the headlight circuit is energized then the transistor T2 (PNP) conducts voltage to the solenoid 57 which holds relay K1 in a closed state. However, upon a pulse voltage the base is biased to block current flow in the transistor T2, the voltage then being removed from coil 57 opens the same.

Consequently, the running or clearance light circuit is turned "on" and "off" as the relay coil 57 is energized and de-energized by transistor T1 when the headlight circuit is not energized. Whereas the running or clearance light circuit is turned "off" and "on" as the coil 57 is de-energized and energized by the T2 when the headlight circuit is energized.

While many modifications of the invention will be obvious to one skilled in the art in view of the teachings of this specification, it is intended that all such modification which falls within the true spirit and scope of this invention be included within the scope of the appended claims.

What is claimed is:

1. A flasher controller for an automotive lamp circuit comprising in combination
   a first integrated circuit having a given "on time" cycle,
   a push button means connected to said first integrating circuit to trigger the "on time" cycle,
   a second integrated circuit for generating free running oscillations of fixed frequency connected to the output of the said first integrating circuit,
   a transistor means having the base connected to the output of the said second integrated circuit,
   a voltage source connected to the collector of the said transistor means,
   a relay means having a solenoid connected to the emitter of the said transistor means and having one contact connected to the said voltage source,
   a lamp circuit connected to the other contact of the said relay means; the series connection of the said voltage source, the said relay means and the said lamp circuit being connected across the said integrating circuits,
   whereupon momentarily depressing the said push button means the "on time" cycle is triggered and modulates the free running oscillation to finite number of pulses in accordance which the said relay means is alternately opened and closed in fixed sequence.

2. The flasher controller circuit of claim 1 wherein the "on" and "off" state of a second lamp circuit is incorporated by including
   a second relay means with the primary contact connected to the output of the said second integrated circuit and the normally engaged secondary contact connected to the first transistor means,
   a second lamp circuit connected in series with the solenoid of the second relay means,
   a second transistor means with the base connected to the normally open secondary contact of the said relay means and the collector and emitter connected in a series loop with the collector and emitter of the said first transistor means; the said series loop connected across the said integrated circuits and in series with the solenoid of the said first relay means,
   whereupon illumination of the said second lamp circuit both the said second relay means is actuated from the normal state and connects the output of the said second integrated circuit to the base of the second transistor means and the said second transistor means is placed in a conductive state and as the consequence the said first relay means is held in closed position for illumination of the said first lamp circuit,
   whereupon as the result of the bias applied alternately to the said second transistor by the finite number of pulses, the said second transistor means becomes non-conductive and conductive in fixed sequence.

3. A flasher controller of circuit claim 2 wherein a two position by pass switch means is connected between the solenoid of the said first relay means and in normal position in series with the series loop of collectors and emitters of the said first and second transistor means, and connected to the said second lamp circuit at the normally open position,
   whereupon manually moving the said "by pass" switch from the normal position the flasher controller circuit is bypassed and thereafter the said first and second lamp circuit will become illuminated and extinguished concurrently.

4. A flasher controller circuit of claim 2 wherein a time delay circuit is connected between and in series with the said second lamp circuit and the said second relay means consisting of
   a diode connected in series with the said second lamp circuit,
   a current limiting resistor connected in series with the said diode,
   a time delay circuit consisting of a resistor and capacitance in series and connected in parallel with the solenoid of the said second relay means and in series with the said current limiting resistor,
   whereby the said first lamp circuit will continue to be illuminated for a given time delay after the extinguishment of the said second lamp circuit.

5. A flasher controller circuit of claim 2 wherein the said push button means is provided with a mechanical locking means for holding the said push button means in a depressed position for production of continuous pulses to illuminate and extinguish the said first lamp circuit in a continuous sequence.

6. The flasher controller of claim 2 wherein the said push button means incorporates a light means connected to the said first lamp circuit thereby the said light means and the said first lamp circuit will illuminate and extinguish together in accordance with the finite pulses initiated by depressing the said push button means.

7. The flasher controller circuit of claim 2 wherein the connection between and in series with the said first voltage source and the said first lamp circuit is accomplished by a dummy multiple contact fuse comprising
   a plurality of conductive sleeves, a plurality of electric contacts, a plurality of non-conductive sleeves and a fastening means,
   whereby the combination of said conductive sleeve with said electric contact are each separated from the succeeding combination of said conductive sleeve and electric conduct by a non-conductive sleeve.

8. The flasher controller circuit of claim 1 wherein the "on time" cycle can be increased or decreased in time duration by adjustment of a variable resistor associated with the said first integrated circuit,
   whereby the finite number of pulses of fixed frequency can be respectively increased or decreased.

9. A flasher controller connected between and in series with a voltage source and a first lamp circuit and in parallel relationship to a second lamp circuit comprising,
   a modulator and an oscillator operatively connected to produce upon triggering the said modulator a finite number of pulses of fixed frequency
   a plurality of transistor means and a plurality of relay means connected in such relationship that the finite number of pulses will bias one of said transistor means from the non-conductive to conductive state and the other said transistor means from a non-conducting to a conducting state
   the said relay means also connecting the first and second lamp circuits in such relationship with the said transistor means that alternate illumination and extinguishment of the said first lamp means established by the finite pulses of fixed frequency will not be disturbed by the illumination or extinguishment of the said second lamp circuit.

* * * * *